United States Patent [19]

Rabii

[11] Patent Number: 5,093,721
[45] Date of Patent: Mar. 3, 1992

[54] LINE INTERPOLATOR WITH PRESERVATION OF DIAGONAL RESOLUTION

[75] Inventor: Khosro M. Rabii, Arlington Heights, Ill.

[73] Assignee: Zenith Electronics Corporation, Glenview, Ill.

[21] Appl. No.: 550,605

[22] Filed: Jul. 10, 1990

[51] Int. Cl.$^5$ .............. H04N 7/12; H04N 7/01; H04N 7/04; H04N 11/06
[52] U.S. Cl. .................. 358/135; 358/136; 358/140; 358/141; 358/12
[58] Field of Search ............ 358/135, 136, 140, 141, 358/11, 12, 160

[56] References Cited

U.S. PATENT DOCUMENTS

| | | | |
|---|---|---|---|
| 4,661,850 | 4/1987 | Strolle et al. | 358/136 |
| 4,698,675 | 10/1987 | Casey | 358/160 |
| 4,723,163 | 2/1988 | Skinner | 358/160 |
| 5,016,103 | 5/1991 | Rafii | 358/166 |
| 5,031,042 | 7/1991 | Rabii | 358/167 |

FOREIGN PATENT DOCUMENTS 0187785 8/1988 Japan.

Primary Examiner—John K. Peng

[57] ABSTRACT

A video system includes a scan converter for developing a progressively scanned display of video lines from a two field interlaced line system. A spatial array of six pixels covering two successive video lines is developed and gradients are determined between diagonally opposed pairs of pixels and a vertically opposed pair of pixels in the array. The interpolated pixel is developed by averaging the two pixels in the smallest of the gradients. A non-orthogonal display is developed by using horizontally interpolated pixels in the array developed by averaging successive pairs of real pixels, which introduces an offset of one-half pixel duration to the interpolated pixels. An adaptive peaking and noise coring circuit is included. Another spatial array of three line of pixels, both real and interpolated, is developed and a horizontal, a vertical and two diagonal gradients between pairs of pixels in the array are calculated. Logic circuitry and a maximum value decoder determine a peaking factor based upon the maximum gradient. A simplified adjustable noise coring circuit with symmetrical and asymmetrical peaking is also disclosed.

12 Claims, 8 Drawing Sheets

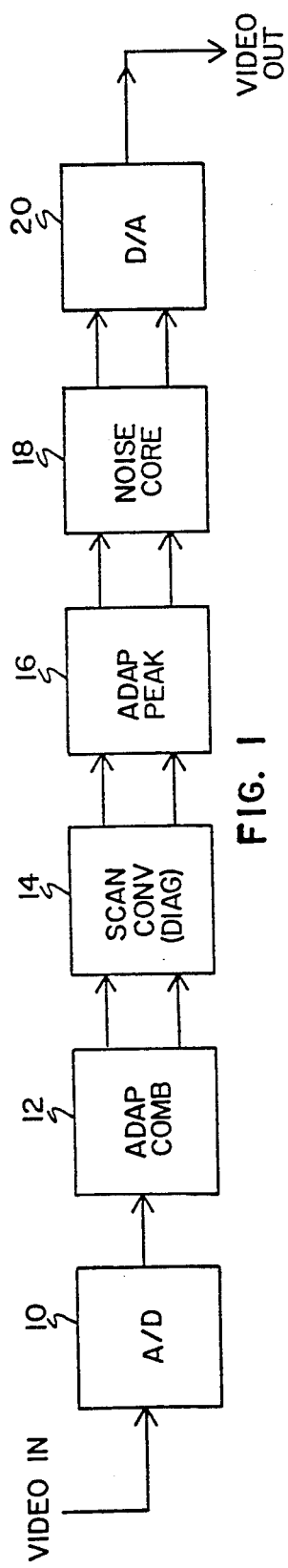
FIG. 1
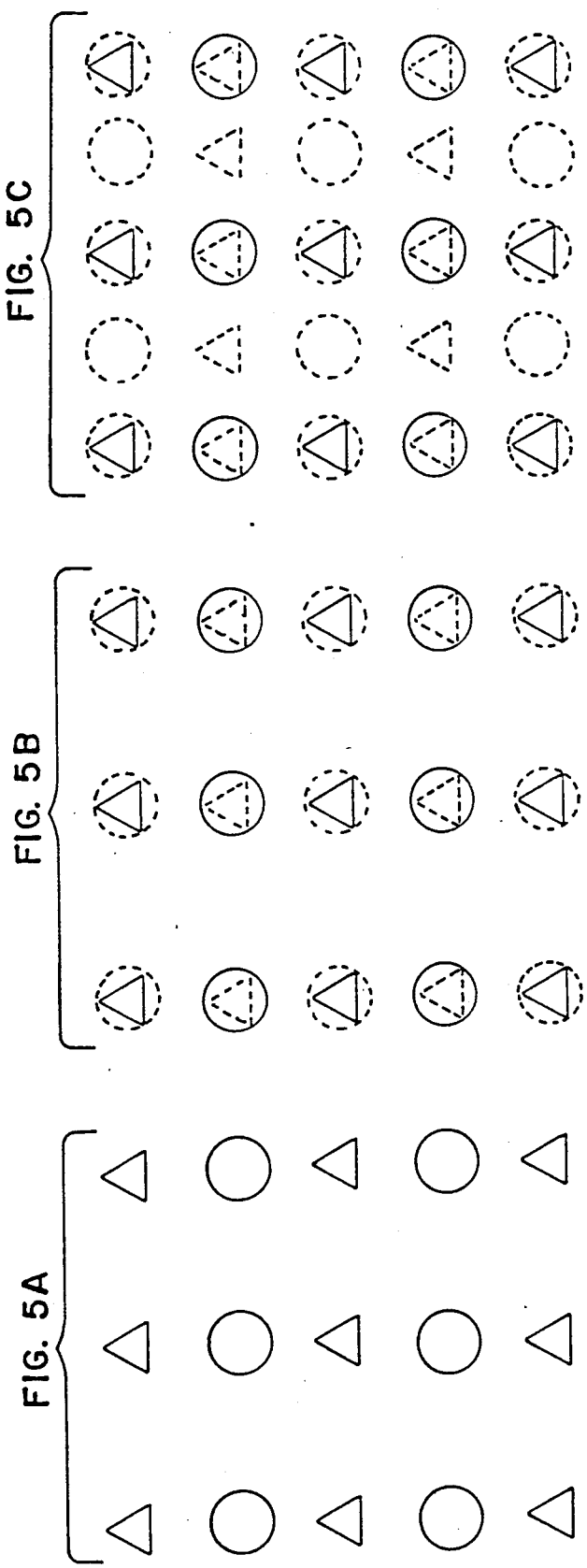
FIG. 5A
FIG. 5B
FIG. 5C

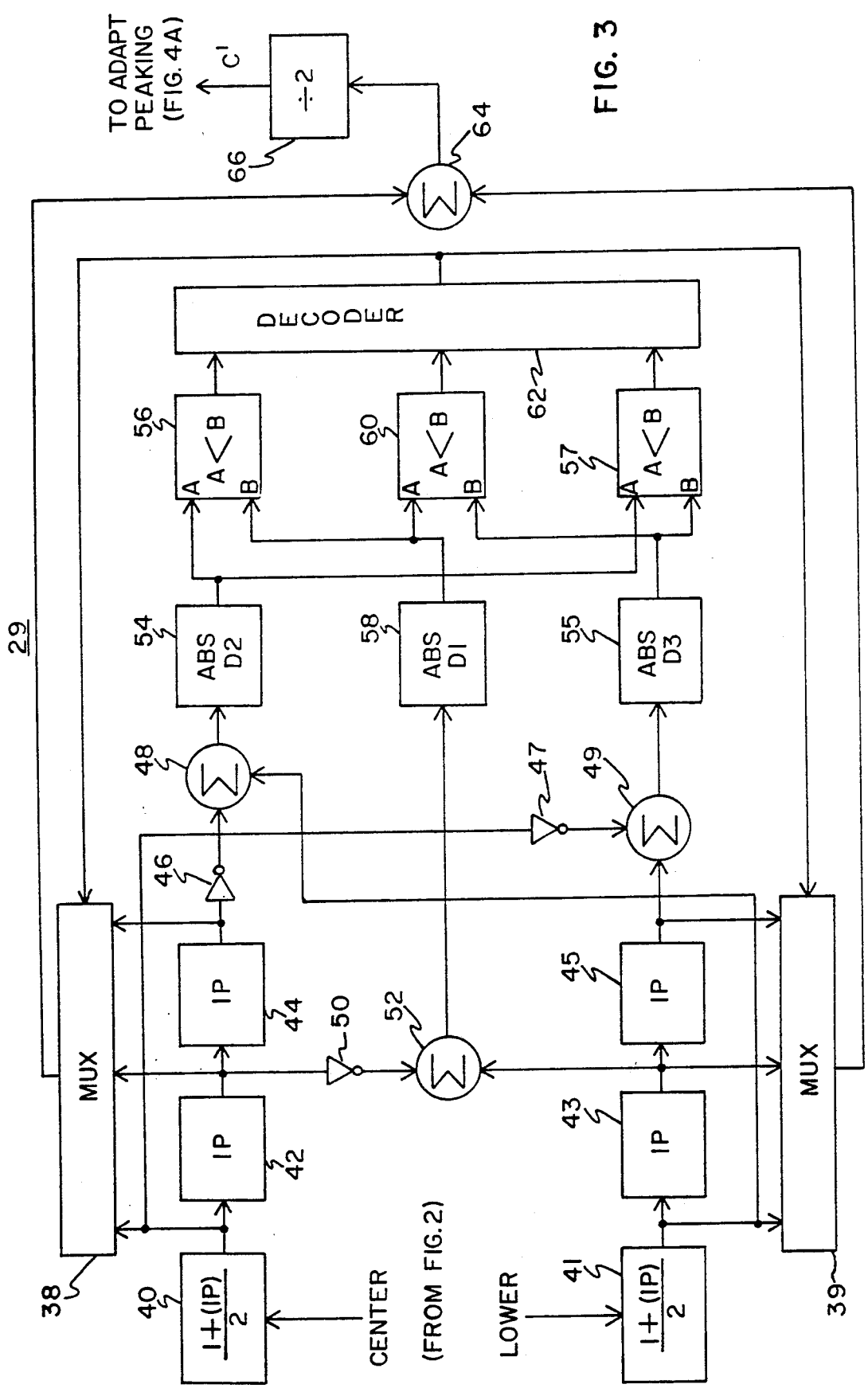

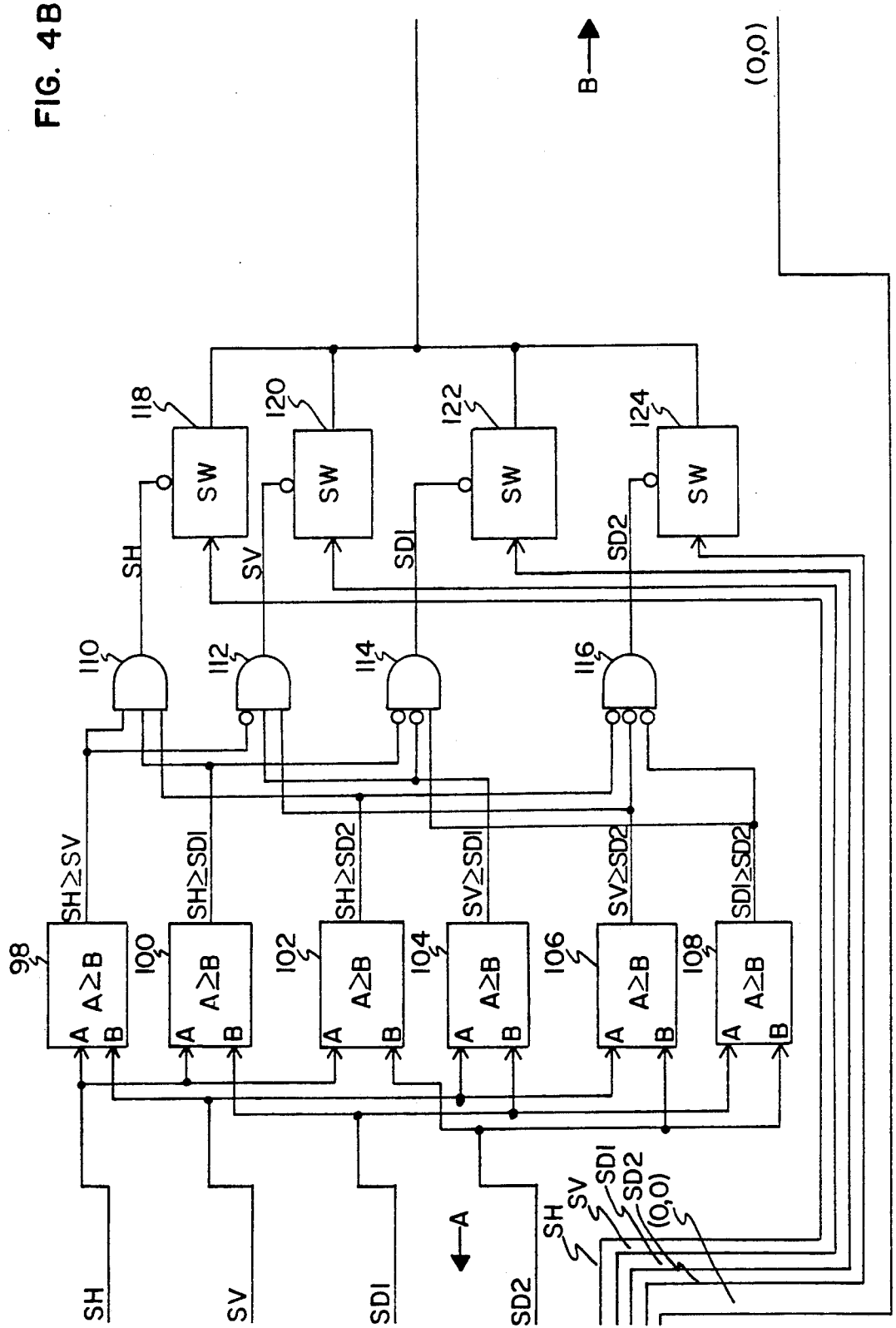

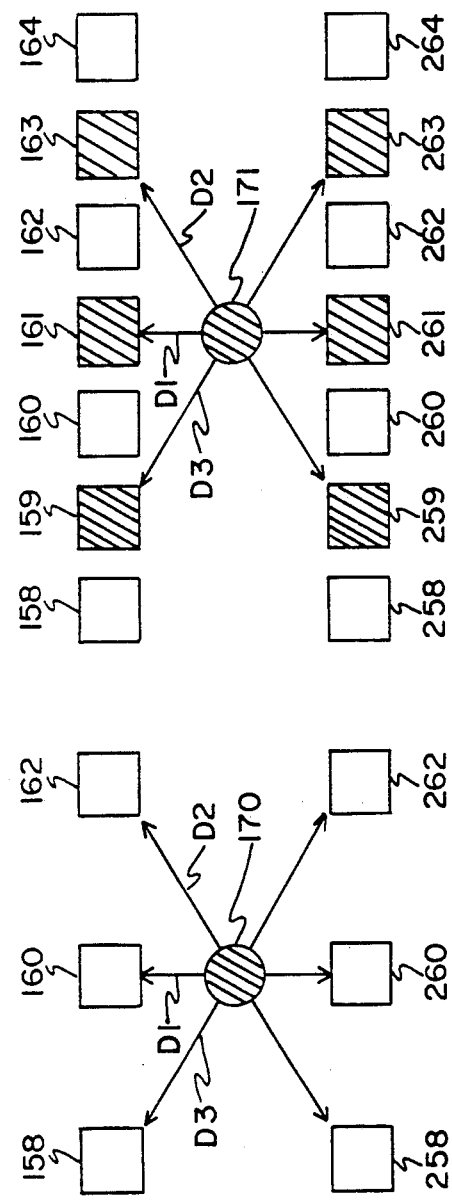
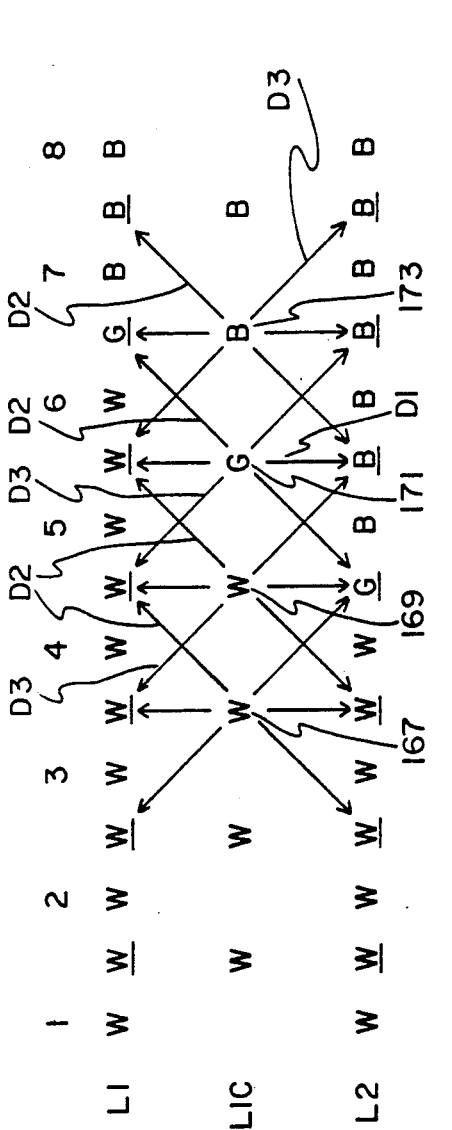
FIG. 7A
FIG. 7B
FIG. 8
FIG. 6A
FIG. 6B
FIG. 6C
FIG. 6D
FIG. 6E
FIG. 6F

LINE INTERPOLATOR WITH PRESERVATION OF DIAGONAL RESOLUTION

CROSS REFERENCE TO RELATED PATENT APPLICATIONS

This application is related to application Ser. No. 349,192, filed 5/9/89, now abandoned entitled 2H COMB with SPATIAL MIXING and application Ser. No. 394,006, filed 8/17/89, entitled SPATIAL SCAN CONVERTER WITH VERTICAL DETAIL ENHANCEMENT, now U.S. Pat. No. 5,016,103 both in the names of K. Rabii, and both assigned to Zenith Electronics Corporation. The application also discloses subject matter claimed in the following copending applications of the inventor, Ser. No. 549,869, filed 7/9/90, entitled ADAPTIVE PEAKING CIRCUIT; Ser. No. 549,867, filed 7/9/90, entitled NOISE CORING AND PEAKING CIRCUIT, now U.S. Pat. No. 5,031,042; and Ser. No. 575,269, filed 8/30/90, entitled ADAPTIVE PROGRESSIVE SCAN CONVERTER.

BACKGROUND OF THE INVENTION AND PRIOR ART

This invention relates generally to video signal processing systems and particularly to NTSC type television video signal processing systems.

As is well known, NTSC television signals are prone to a number of distortions including artifacts such as hanging dots, dot crawl, color contamination, highly visible noise in low frequency signal areas of the video display, a visible line structure due to line interlacing and the loss of vertical and horizontal picture detail because of restricted bandwidth. All of the above have been addressed by the prior art in different ways. For example, line comb filters are often used to derive the video and chroma signal components by adding and subtracting adjacent lines of video. This can eliminate cross contamination of the chroma signal into the luma signal and vice versa and enables a wider bandwidth luma signal to be processed. Comb filtering works well to minimize noise and "crosstalk" except in the presence of video variations which give rise to other well-known problems. In the copending application Ser. No. 349,192, an arrangement for determining when to comb filter and how much to comb filter, i.e. whether and how much to comb the two upper lines of a three line display area, the two lower lines, all three lines or whether to "simple decode" the signal is determined by developing gradients between selected pixels in a spatial area that embraces all three video lines. A processing decision for each pixel is made based upon the developed differences. The final processing decision may be modified by reference to processing decisions made for previous pixels in the spatial area and for decisions that the system indicates should be made for subsequent pixels in the spatial area. With that more precise decision making arrangement, combing is done only when it will be of benefit to the video display and avoided when it may introduce objectionable artifacts or otherwise detract from the video display.

The prior art also discloses many techniques for peaking the video signals, i.e. sharpening the signal transitions to give the impression of a wider bandwidth. Because of the subjective nature of video displays and signal peaking, there are many algorithms for determining when a signal should be peaked and the degree to which it should be peaked. Signal peaking circuits are also frequently used in conjunction with so-called "noise coring" circuits which essentially core the signal, i.e., provide a range of signal levels for which no peaking is performed. The purpose is to avoid emphasizing visible noise in a signal.

The interlaced scanning arrangement of an NTSC signal produces two alternating fields having interleaved lines of video. Consequently, each line of pixels in the display is illuminated only fifty percent of the time, i.e. during one of the two alternating fields. This results in a visible line structure which is disconcerting to viewers. The line structure is especially objectionable in receivers and monitors having large display areas, i.e. large screen and projection type television receivers and video monitors. Many arrangements have been developed for converting an interlaced scan system to a progressive scan system, where each line of pixels is scanned (illuminated) in each field, thus eliminating the visible line structure. This is generally accomplished by scanning the display at twice the normal rate and interspersing interpolated lines of video between each pair of real video lines. Commonly, the interpolated lines of video are developed by averaging the video in each successive pair of video lines or by repeating each real line of video. Copending application Ser. No. 349,192 mentioned above, discloses a progressive scan converter that averages successive lines of real video to develop the interpolated lines of video and also enhances the vertical detail between the real lines of video.

This invention is directed to a progressive scan converter having interpolated pixels based upon spatial gradients that preserve diagonal resolution in the video display. Also disclosed is an adaptive peaking circuit that samples pixels in a spatial area and peaks based upon the signal attitute, i.e. in the direction of greatest indicated change in signal. The adaptive peaking invention is the subject of application Ser. No. 549,869. Also disclosed is a very simple noise coring arrangement for providing symmetrical and asymmetrical peaking and noise coring of the peaking component, which is the subject of U.S. Pat. No. 5,031,042. The present invention also is directed to a video processing system that embraces all of the disclosed inventions.

OBJECTS OF THE INVENTION

A principal object of the invention is to provide an improved video processing circuit.

Another object of the invention is to provide a video processing circuit that preserves diagonal resolution.

A further object of the invention is to provide a novel video processing system that includes a scan converter that preserves diagonal resolution.

A still further object of the invention is to provide a novel video processing system that includes an improved scan converter and an adaptive peaking arrangement for peaking video signals as a function of their attitudes.

Still another object of the invention is to provide a novel video processing system having a progressive scan converter with diagonal resolution, signal peaking based upon signal attitude and noise coring.

BRIEF DESCRIPTION OF THE DRAWINGS

These and other objects and advantages of the invention will be apparent upon reading the following description in conjunction with the drawings, in which:

FIG. 1 represents a simplified block diagram of a video processing system using all of the disclosed inventions;

FIG. 3 is a block diagram of the spatial interpolator used in the scan converter;

FIGS. 4A, 4B and 4C together form a block diagram of an adaptive peaking circuit and a noise coring circuit that symmetrically and asymmetrically peaks the peaking component;

FIGS. 5A, 5B and 5C illustrate interlaced scanning, progressive scanning with orthogonal pixel interpolation, and progressive scanning with non-orthogonal pixel interpolation, respectively;

FIGS. 6A-6F represent a simplified video display and two lines of video signals for illustrating the diagonal resolution aspect of the invention;

FIG. 7A represents orthogonal spatial interpolation usable with the scan converter of the invention;

FIG. 7B represents non-orthogonal spatial interpolation used in the preferred scan converter of the invention;

FIG. 8 illustrates interpolation of pixels for the video line signals of FIGS. 6B and 6C;

DESCRIPTION OF THE PREFERRED EMBODIMENTS

Figure 2:
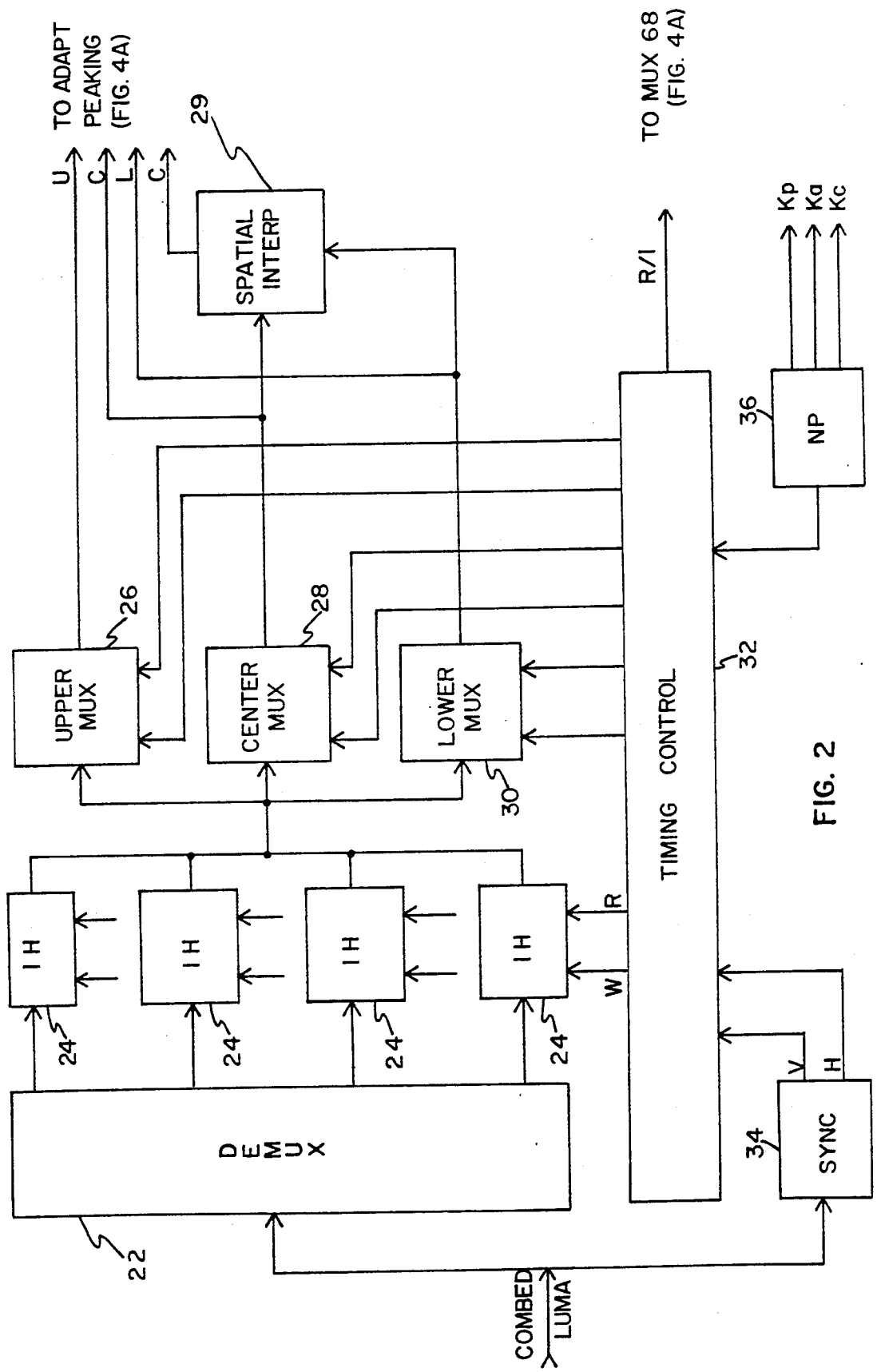
FIG. 2 is a partial block diagram of a scan converter constructed in accordance with the invention.

FIG. 1 shows a simplified block diagram of a video processing system constructed in accordance with the present invention. An analog source of video input (not shown) is coupled to an analog to digital (A/D) converter 10 where the signal is digitized, or sampled, and reproduced in digital form in a well known manner. The output of the A/D converter 10 is applied to an adaptive combing circuit 12, preferably in the form disclosed in copending application Ser. No. 349,192 mentioned above. In that arrangement, three horizontal lines of video are stored and the pixels in a predetermined spatial area that embraces all three video lines are analyzed to determine the differences or gradients between selected pixels. Based upon the vertical, horizontal and diagonal differences among the pixels in the spatial area, a decision is made, for each pixel, as to whether corresponding pixels in adjacent ones of the video lines should be comb filtered, and if so, the type of combing and the degree of combing. The decisions are whether to comb the pixels: in the upper two video lines; in the lower two video lines; in all three of the video lines or whether to separate the luma and chroma signals by simple decoding. These decisions are interim, however, and the final processing decision for each pixel is based upon further comparison with processing decisions that were made for previous pixels and processing decisions that are indicated for subsequent pixels. Thus the final processing decision for each pixel takes into account both the history and the future of the video signal and makes for smooth transitions by both combing and simple decoding in varying percentages. The result is an arrangement that combs the signal in varying degrees when combing will clearly be of benefit to the display. When comb filtering might adversely affect the display, the luma and chroma signals are separated by simple decoding and at other times simultaneous combing and simple decoding are performed on the video signals.

The output of the adaptive comb circuit 12 is coupled to the scan converter 14 via two lines, one of which carries the luma signal and the other of which carries the chroma signal. The scan converter converts the interlaced NTSC video signal for progressive scanning and supplies an adaptive peaking circuit 16, where peaking decisions are made on the basis of the "attitude" of the signal. In this connection, attitude refers to the dynamics of the signal, i.e. whether the signal is stationary or is changing. Peaking is based upon analysis of pixel gradients or differences in a spatial area around the pixel in question and is in the direction of greatest signal change. The amount of peaking is increased when the amount of the signal change increases. The output of the adaptive peaking circuit 16 is a peaking component that is coupled to a noise coring circuit 18 where a signal threshold is established before any peaking is performed. Coring the signal minimizes the probability of peaking visible noise in the signal. As will be seen, the peaking is not only controllable as to amount, but is performed in both a symmetrical and an asymmetrical manner so that negative and positive portions of the signal may be peaked differently. The output of noise coring circuit 18 is the processed video signal which is coupled to a digital to analog (D/A) converter 20 where it is converted to analog form.

Referring to FIG. 2, the scan converter portion of the above described copending application Ser. No. 349,192 is shown with the combed luma signal being supplied to a demultiplexer 22. A synchronizing signal separator 34 is supplied from a composite video source (not shown). Demultiplexer 22 in turn supplies four-one horizontal line (1H) memories 24 which are controlled by W write (W) and read (R) signals from a timing and control circuit 32 that is supplied with vertical (V) and horizontal (H) timing information from sync separator 34. A microprocessor 36 controls the operation of timing and control circuit 32 and supplies a series of programmable factors Kp, Ka and Kc, as will be described. An upper line (U) multiplexer 26, a center line (C) multiplexer 28 and a lower line (L) multiplexer 30 are each supplied with the outputs of the 1H memories 24 and are controlled by timing and control circuit 32 for developing an upper line, a center line and a lower line of scan converted and combed video pixels. All three lines of video pixels, labelled U, C and L, are supplied to the adaptive peaking circuit in FIG. 4A whereas the center and lower lines are applied to the spatial interpolator of FIG. 3. The output of the spatial interpolator is a signal C', corresponding to an interpolated line of pixels based upon spatial gradients of pixels on the C and L video lines. It will be appreciated that new lines of video pixels are successively replacing the lines of video pixels in the memories and that C' represents the interpolated video pixels between corresponding pixels from MUX 28 and MUX 29. As fully discussed in the above described copending application Ser. No. 349,192, the successive lines of pixels are written into the 1H memories at a rate of 4 Fc whereas the pixels are read from the 1H memories at twice the rate, namely 8 Fc. An R/I (real/interpolated) output signal from timing and control 32 is supplied to an appropriate multiplexer (68) in FIG. 4A for controlling the supply of real and interpolated pixels for adaptive peaking. Interpolator 29 in FIG. 2 is supplied with the output of the center MUX 28 and the lower MUX 30 and develops the interpolated output C′ which, in conjunction with the real video line outputs U, C and L, is applied to the adaptive peaking circuit in FIG. 4A. In the above described copending application Ser. No. 349,192, vertical detail processing is performed on the real video pixels in the scan converted signal. In this arrangement of the invention, the spatial interpolator preserves diagonal resolution in the video by analyzing the relationship between selected pixels in an array of pixels about the pixel being processed. There is therefore no need for the vertical detail processing of the prior circuit.

Referring to FIG. 3, a schematic diagram of the diagonal interpolator 29 is shown. The pixels from the C and L video lines from FIG. 2 are supplied to pixel averaging circuits 40 and 41, which simply adds each successive pair of pixels and divides by two. This effectively develops a series of horizontally interpolated pixels in place of real pixels and which are positioned by one-half pixel. The output of two-pixel averaging circuit 40 is coupled to a multiplexer 38, to a one pixel (1P) delay circuit 42, and through an inverter 47 to a summer 49. The output of delay circuit 42 is coupled to multiplexer 38, to another 1P delay circuit 44 and also through an inverter 50 to a summer 52. The output of delay circuit 44 is coupled to multiplexer 38 and through an inverter 46 to a summer 48. The output of two-pixel averaging circuit 41 is similarly supplied to a 1P delay circuit 43, to a multiplexer 39 and to summer 48. Delay circuit 43 in turn is coupled to a 1P delay circuit 45, to multiplexer 39 and to summer 52. The output of delay circuit 45 is coupled to multiplexer 39 and to summer 49. The outputs of summers 48, 49 and 52 are supplied to absolute value circuits 54, 55 and 58, respectively, which are labelled D2, D3 and D1, respectively. As will be seen in connection with FIGS. 7A, 7B and 8, the various pixel delay circuits, inverters and summers function to develop three differences or gradients D1, D2 and D3 between selected pairs of pixels in a spatial array. The outputs of the absolute value circuits are coupled to comparator circuits 56, 60 and 57 where a logic output is produced when the signal at the B inputs of a comparator is greater than the signal at its A input. The outputs of the comparator circuits are supplied to a decoder 62 which, in turn, drives multiplexers 38 and 39. Multiplexers 38 and 39 couple the selected one of the three inputs (determined by the lesser of D1, D2 and D3), to a summer 64, the output of which is applied to a divide-by-two circuit 66 and develops the C′ interpolated signal (pixel). As may be seen by referring back to FIG. 2, the center interpolated video pixel C′ is coupled along with the upper, center and lower video pixel signals to the adaptive peaking circuit in FIG. 4A.

Figure 4A:
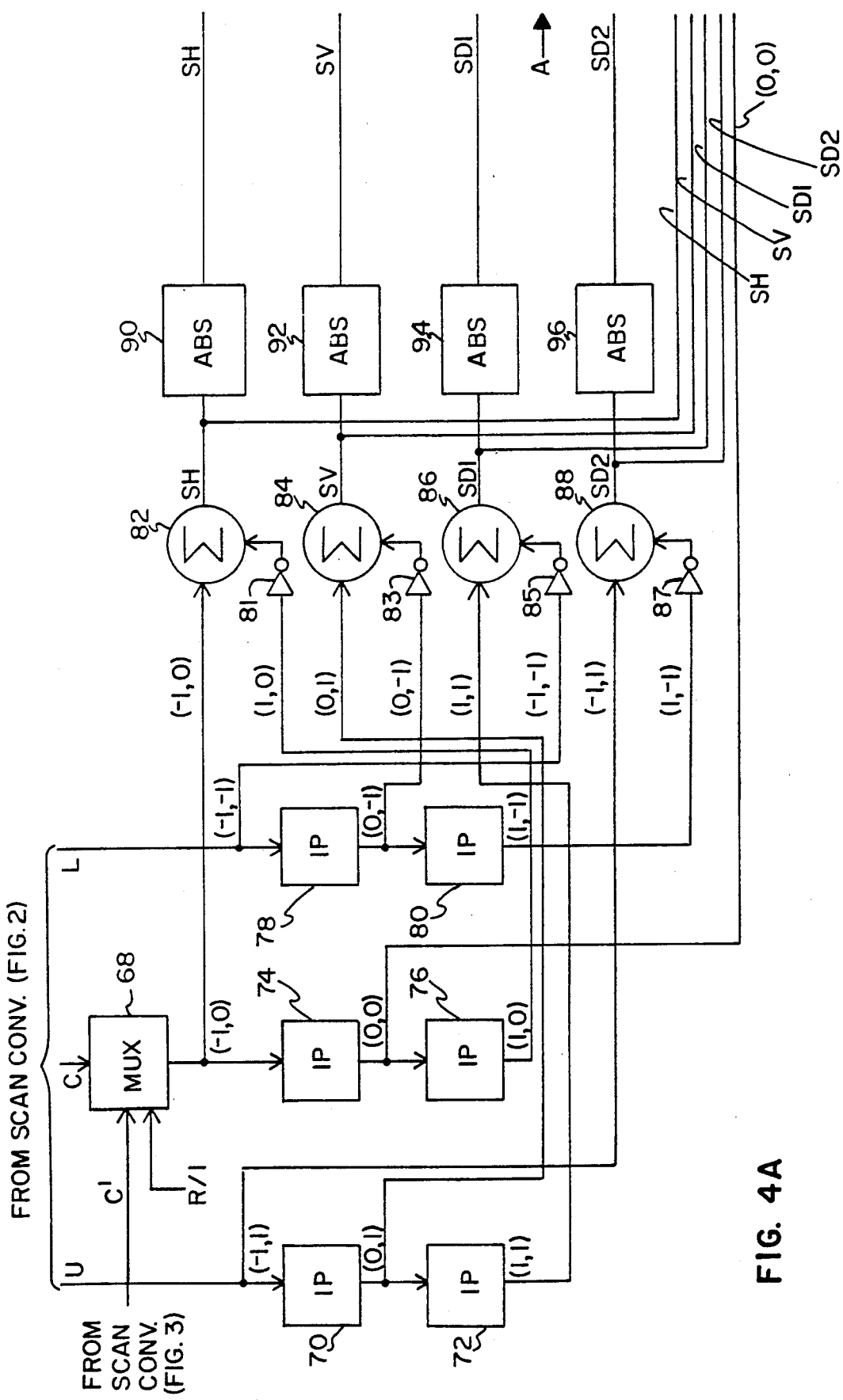
Figure 4C:
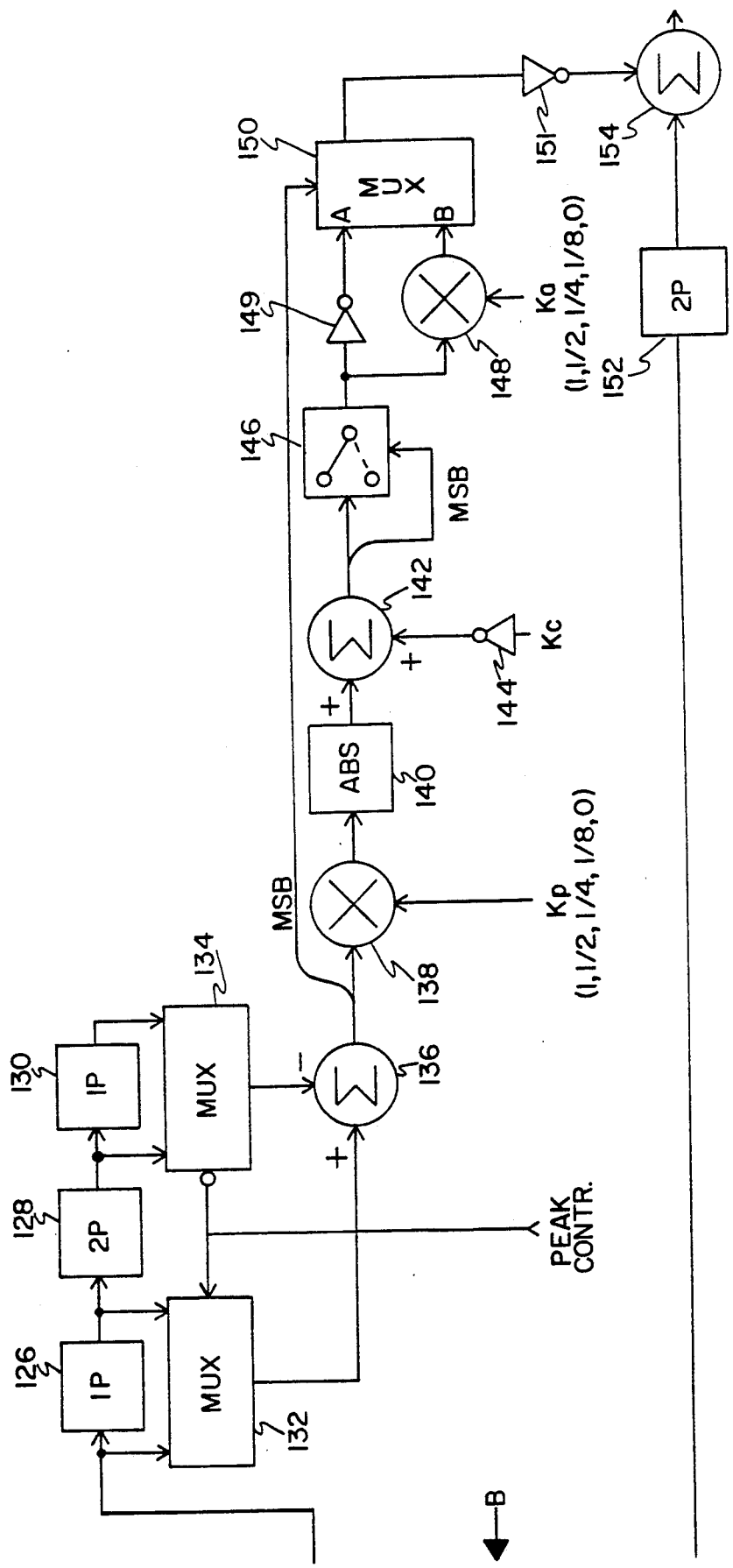
Figure 9:
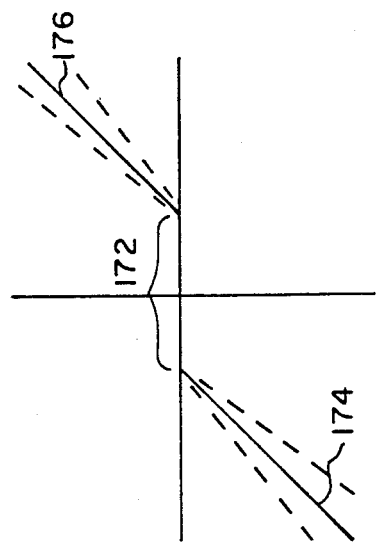
FIG. 9 represents an array of pixels used in the adaptive noise peaking portion of the invention.

In referring to FIGS. 4A, 4B and 4C, the figures should be aligned with the arrow heads A in FIGS. 4A and 4B touching and the arrow heads B in FIGS. 4B and 4C touching. FIG. 9 may also be referred to since it shows the spatial array and pixel differences or gradients calculated for the adaptive peaking circuit. The upper, center and lower video pixels from FIG. 2 are applied to 1P delay circuits 70 and 78, respectively, whereas the center pixel C is applied to a multiplexer 68 along with the C′ interpolated pixel from the interpolator 29 in FIG. 3. Multiplexer 68 is controlled by an R/I control signal from microprocessor 36 so that it alternately supplies a line of real video pixels and a line of interpolated video pixels C′. The output of multiplexer 68 is supplied to a 1P delay circuit 74. The delay circuits 70, 74 and 78 in turn supply 1P delay circuits 72, 76 and 80, respectively. As will be seen, these 1P delay circuits develop another spatial array of pixels (for peaking purposes) with peaking being controlled as a function of the maximum difference between selected pixel pairs. The pixels in the spatial array are identified by standard XY coordinates in FIG. 9. The center line pixel signal (real or interpolated) is applied to a summer 82 along with the output of delay circuit 76, which is applied through an inverter 81. Therefore the digital value of pixel (1, 0) is subtracted from the digital value of pixel (−1, 0). The output of delay circuit 70 is coupled to a summer 84 along with the output of delay circuit 78, which is applied through an inverter 83. This results in subtracting pixel (0, −1) from pixel (0, 1). The output of delay circuit 72 is coupled to a summer 86 along with the lower line pixel signal L, which is applied through an inverter 85. This results in pixel (−1, −1) being subtracted from pixel (1, 1). Similarly, the upper pixel signal U is applied to a summer 88 along with the output of delay circuit 80, which is applied through an inverter 87 and results in pixel (1, −1) being subtracted from pixel (−1, 1). As indicated, the output of summer 82 is a difference SH, the output of summer 84 is a difference SV, the output of summer 86 is a difference SD1 and that from summer 88 is a difference SD2. These differences are applied, through absolute value circuits 90, 92, 94 and 96, respectively, to a corresponding plurality of comparators 98, 100, 102, 104, 106 and 108 in FIG. 4B. The outputs of the comparators are interconnected to the inputs of a plurality of AND gates 110, 112, 114 and 116 with the logic signal level polarities indicated. The AND gates comprise a maximum value decoder and the corresponding largest one of the four differences develops an output from its corresponding AND gate. Each comparator output controls a respective one of four tri-state switches 118, 120, 122 and 124, respectively. The switches are also supplied with the SH, SV, SD1 and SD2 differences. Only one of the tri-state switches 118, 120, 122 and 124 is operated at any given time (depending upon the largest of the differences SH, SV, SD1 and SD2). The tri-state switches become open circuits when they are not activated, i.e. closed to couple their input signals to their outputs. Thus the common output of the tri-state switches exhibits one of the differences SD, SH, SD1 and SD2 without interaction from the signals coupled to the deactivated switches. The common output connection of the tri-state switches is supplied to an integrater in FIG. 4C along with the output of delay circuit 74, which is pixel (0, 0). This pixel is seen to be the one that is being processed, whether it is real or interpolated.

The integrator is made up of a series connection of a 1P delay circuit 126, a 2P delay circuit 128 and a 1P delay circuit 130 and a pair of multiplexers 132 and 134. The outputs of the multiplexers 128 and 130 are applied to a summer 136 which develops an 8 bit signal in two's complement form with the most significant bit (MSB) indicating the polarity of the signal being applied to control operation of another multiplexer 150. The remaining bits of the output of summer 136 are applied to a multiplier 138 which is controllable by peaking factor Kp from microprocessor 36 (FIG. 2). The peaking factor Kp affects both polarities of the signal and therefore provides symmetrical peaking. The output of multiplier 138 is applied to an absolute value circuit 140, the output of which is applied to another summer 142 which receives a programmable coring factor Kc from microprocessor 36 through an inverter 144. The MSB of the output of summer 132 is used to control a switch 146 which connects the output of the summer 142 to a multiplier 148 and to an inverter 149, depending upon the polarity of the signal. The output of the inverter 149 supplies the A input of multiplexer 15 and the output of multiplier 148 supplies its B input. Another peaking factor Ka from microprocessor 36 is applied to control multiplier 148. As will be seen, this peaking factor Ka only affects one polarity of the signal and therefore provides asymmetrical peaking. The output of multiplexer 150 is applied through an inverter 161 to a summer 154 which is also supplied with the output of delay circuit 74 (FIG. 4A) through a 2P delay circuit 152. The resultant fully processed luma output pixel signal from summer 154 is passed to D/A converter 20 (FIG. 1).

The spatial interpolation system for retaining diagonal resolution in the preferred embodiment produces a non-orthogonal display. The inventive system, however, may also be used in a conventional orthogonal video display. The distiction is illustrated in FIGS. 5A, 5B and 5C. In FIG. 5A, the triangles indicate displayed pixels in one field of a conventional two field interlaced scan arrangement and the circles indicate displayed pixels in the other field. The triangles and the circles are seen to be in vertical alignment and represents a conventional orthogonal display system. FIG. 5B represents a scan converted (progressive scan) system with the interpolated pixels being indicated in dashed lines. The triangles are overlaid with dashed line circles and the circles are overlaid with dashed line triangles since the interpolated pixels are in vertical alignment with the real pixels. In the display of FIG. 5C, the interpolated pixels are horizontally offset and interspersed between the real pixels in each line of video. This is a non-orthogonal display and constitutes the preferred implementation of the invention. The potential for even greater improvement in diagonal resolution is immediately apparent.

The diagonal resolution improvement is illustrated in connection with the diagrams in FIGS. 6A-6F where a small portion of a video display, consisting of an upper triangular portion of a white field and a lower truncated triangular portion of a black field, is shown. Three scan lines L1, L2 and L3 are shown with the horizontal pixels being identified above the display in the form of W's and B's, for white and black, respectively. G is used to denote gray, formed by averaging a black pixel with a white pixel. The display is simplified and exaggerated for the sake of illustration. FIG. 6B illustrates the video corresponding to scan line L1, which has six pixels of white, followed by two pixels of black. FIG. 6C similarly illustrates the video developed by scan L2 which has four pixels of white followed by four pixels of black. Scan line L1A in FIG. 6D illustrates an ideal interpolated line between L1 and L2 which would have five pixels of white followed by three pixels of black. FIG. 6E illustrates a scan line L1B. The signal for L1B represents an interpolation between the lines L1 and L2 by a method similar to that disclosed in U.S. Pat. No. 5,016,103, i.e. by adding the two lines and dividing by two. Scan line L1B includes four pixels of white followed by two pixels of gray and two pixels of black. This line L1B departs from the ideal interpolated line L1A in that there is a two pixel gray step defining the transition between the white and black video edge. In FIG. 6F, an interpolated line L1C developed in accordance with the circuit of FIG. 3, has five pixels of white followed by one pixel of gray and two pixels of black. Mere observation of FIGS. 6E and 6F clearly shows that interpolated line L1C has less error that the prior art in that it exhibits greater diagonal resolution.

In FIG. 7A, an illustration of the spatial interpolation system of the invention, as applied to an orthogonal display, is illustrated whereas in FIG. 7B, the inventive spatial interpolation system, as applied to a preferred non-orthogonal display, is shown. In the illustrations, the real pixels 158, 160, 162 and 164 on one line and the corresponding real pixels 258, 260, 262 and 264 on the next adjacent line are shown with respect to the interpolated display pixels 170 and 171. The interpolated pixels are shown cross hatched. In FIG. 7A interpolated display pixel 170 is vertically aligned with real pixels 160 and 260. The differences D1, D2 and D3 are taken between vertically displaced pixels 160 and 260, diagonally displaced pixels 162 and 258, and diagonally displaced pixels 262 and 158, respectively. The value of the interpolated pixel 170 is developed based upon the smallest of the three differences D1, D2 and D3. In FIG. 7B the real pixels 158, 160, 162 and 164 in the upper line and the real pixels 258, 260, 262 and 264 in the succeeding line are interspersed with horizontally interpolated non display pixels. Hence, interpolated pixels 159, 161 and 163 are interspersed with real pixels 158, 160, 162 and 164 in the upper line and horizontally interpolated pixels 259, 261 and 263 are interspersed with real pixels 258, 260, 262 and 264 in the lower line. These interpolated pixels are developed by the averaging circuits at the input of FIG. 4A and comprise successive pairs of real pixels being averaged together. These horizontally interpolated pixels are not displayed, but are only used to develop a spatial gradient from which an interpolated display pixel is developed. The interpolated pixel display 171 is produced by developing the spatial differences D1, D2 and D3 between indicated pairs of horizontally interpolated pixels. To recapitulate, the horizontally interpolated pixels 159, 161, 163, 259, 261 and 263 are not part of the displayed signal but are calculated and used in the development of an interpolated pixel 171, which is displayed. When pixel 171 is displayed, it will occupy a non-orthogonal position with respect to the real pixels in the two lines due to the averaging delay and will therefore conform to the arrangment illustrated in FIG. 5C.

FIG. 8 shows an expanded version of the W and B pixels in scan lines L1 and L2 of FIG. 6B and 6C, respectively, and the process of interpolation used to develop the pixels in scan line L1C in FIG. 6F. In FIG. 8 the underlined pixels in L1 and L2 are horizontally interpolated (not displayed) pixels and the non-underlined pixels are both real and displayed. It should be noted that the depiction is for illustrative purposes only. In the interpolation circuit of FIG. 3, no real pixels are found in L1 and L2 because they are converted into horizontally interpolated pixel values for determination of the differences D1, D2 and D3. Scan line L1 (corresponding to FIG. 6B) has six white real pixels, followed by two black real pixels. The horizontally interpolated pixels between the real pixels consist of five whites, one gray and one black, the gray being the result of averaging the sixth white real pixel and the seventh black real pixel. Similarly, scan line L2 has four white real pixels followed by four black real pixels. The horizontally interpolated, but not displayed, pixels consist of three whites, one gray and three black pixels. Remembering that the interpolated pixel takes the average value of the pixels exhibiting the smallest difference among the measured differences D1, D2 and D3, scan line L1C is seen to consist of four white pixels followed by a gray pixel and a black pixel. The arrows indicate the horizontally interpolated pixel pairs used to develop the differences D1, D2 and D3 for interpolated display pixel 171. The absolute value of difference D1 has the least value (G-G) and the value of display pixel 171 corresponds to the average thereof. The other differences D1 and D3 result in larger values since D1 is (W-B) and D3 is (B-W). The next interpolated pixel 173 takes the value of black because the smallest difference D2 is between the two diagonally displaced black pixels. This is so since D1 is (B-G) and D3 is (B-W). The previous interpolated display pixel 169 is white because the smallest difference is D2 between the diagonally displaced horizontally interpolated white pixels, with D1 being (G-W) and D3 being (B TM W). For interpolated display pixel 167, white is selected because either D1 (W-W) or D2 (W-W) is smaller than D3 (G-W). Using the smallest difference among the selected pixel pairs in the spatial array to develop the interpolated pixel thus helps preserve the diagonal resolution of the display as illustrated by the interpolated scan line L1C in FIG. 6F. While the effect is better in the non-orthogonal display, the spatial interpolation helps diagonal resolution in the orthogonal display also Reverting to FIG. 3, the averaging circuits 40 and 41 develop the horizontally interpolated but not displayed pixels 159, 161, 163, etc. in FIG. 7B between the adjacent real pixels 158, 160, 162 and 164. The 1P delay circuits 42, 44, 43 and 45, the summer circuits 48, 49, 52 and the inverters 46, 47 and 50 develop the differences D1, D2 and D3 as indicated. The absolute values of these differences are compared by the comparators 56, 57 and 60 with the least difference being determined by decoder 62 which controls operation of the multiplexers 38 and 39 to pass the selected horizontally interpolated pixels to summer 64 based upon the smallest of D1, D2 and D3. The pixel values from the multiplexers 38 and 39 are combined in summer 62 and divided by two (averaged) to develop the value for interpolated display pixel C'.

Operation of the adaptive peaking circuit of the invention will be best understood by reference to FIG. 4A, FIG. 4B and FIG. 9. The invention peaks a signal undergoing a large change but does not peak a signal undergoing no change. This obviates the undesirable effects of prior art circuits that apply peaking to signals of a certain magnitude. The adaptive peaking of the invention is based upon pixel gradients in a spatial area that embraces both past pixels and future pixels. Specifically, with reference to FIG. 9, a spatial group or cluster of eight pixels, covering three video lines, is developed and the differences between vertically, horizontally and diagonally displaced pairs of pixels in the cluster are derived. The pixel at the center of the cluster, that is on the middle or center line of the three lines embraced by the array identified as (0, 0) is the pixel being processed for display. Assuming left to right and top to bottom scanning, the previous pixel in the center line is identified as (1, 0) and the following pixel in that line is (−1, 0). Similarly, the pixels on the upper line, reading from left to right, are (−1, 1), (0, 1) and (1, 1). The pixels on the lower line of the cluster are identified as (−1, −1), (0, −1) and (1, −1). The horizontal gradient SH is developed by subtracting the pixels in locations (−1, 0) and (1, 0). The vertical gradient SV is obtained by calculating the difference between pixels (0, +1) and (0, −1). The gradient SD1 is obtained by the difference between the diagonally situated pixels (1, −1) and (−1, 1). The gradient SD2 is developed by calculating the difference between diagonally displaced pixels (1, 1) and (−1, −1). In FIG. 4A, the pixels are identified at the inputs and outputs of the 1P delay circuits. Their application to the summers 82, 84, 86 and 88 produce the gradients SH, SV, SD1 and SD2 as shown. These gradients are developed in absolute value form at the output of the absolute value circuits 90, 92, 94 and 96.

In FIG. 4B the absolute values of these gradients are applied to a gradient differentiator arrangement comprising the comparators 98, 100, 102, 104, 106 and 108. Their outputs are applied to a maximum decoder consisting of AND gates 110, 112, 114 and 116. The result is that the largest of the gradients SH, SV, SD1 and SD2 controls operation of the corresponding one of the tri-state switches 118, 120, 122 and 124 to produce the largest gradient at its common output, which is not an absolute value, but rather exhibits a polarity characteristic.

The arrangement determines the largest gradient among vertically, horizontally and diagonally displaced pairs of pixels in the cluster. That gradient is passed to the integrator circuit in FIG. 4C consisting of the pixel delay circuits 126, 128 and 130 and the multiplexer circuits 132 and 134. The integrator precludes noise effects and artifacts which may result from peaking signals of extremely short duration. A peaking control, which may be selectively controlled by the viewer functions as a noise suppressor. It is preferably set to peak only for signals over about 2 MHz. Also peaking determinations are made by averaging signals over a number of pixels rather than over one or two pixels. That is the function of the integrator which slows down the response of the peaking arrangement. The output of summer 136 is an 8 bit luma signal in two's complement form. The most significant bit is used to control multiplexer 150. Noise coring and peaking, both symmetrical and asymmetrical, are performed by the remaining circuitry.

Figure 10D:
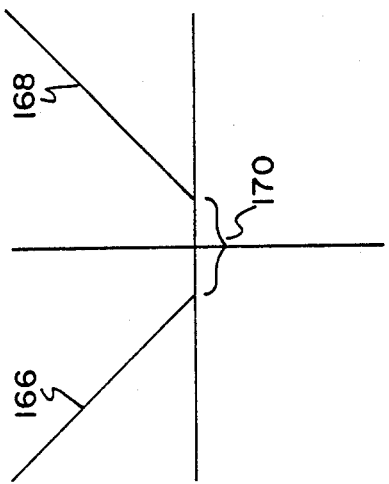
FIGS. 10A-10D are waveforms illustrating, noise coring and symmetrical and asymmetrical peaking of the peaked component in accordance with the invention.
Figure 10C:
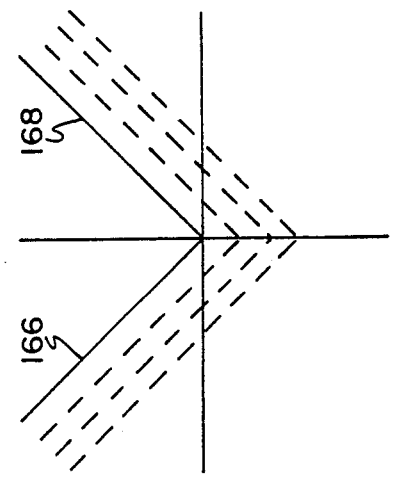
Figure 10B:
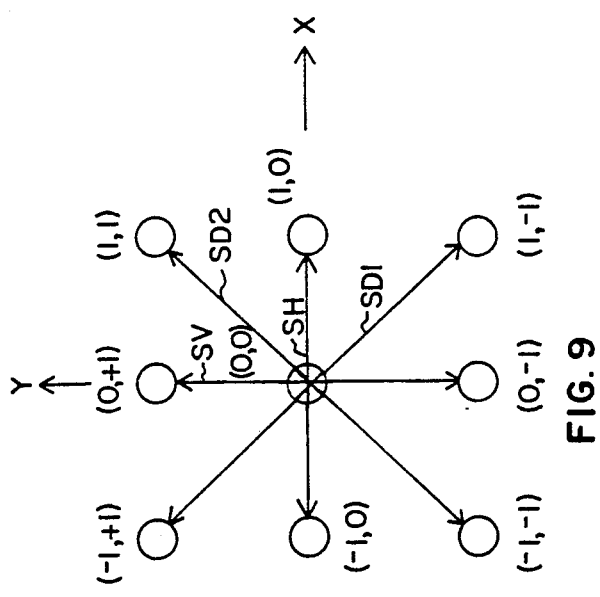
Figure 10A:
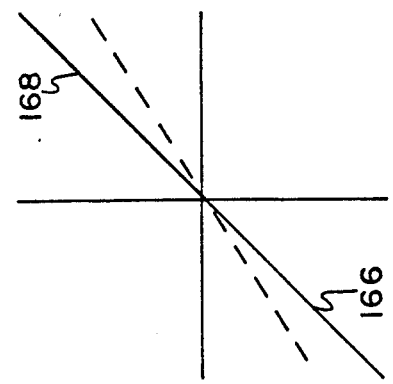

A multiplier 138 is controlled by a peaking factor Kp which, in the preferred embodiment, may be set in the indicated increments between one and zero. As indicated by the waveform in FIG. 10A, the slope of portions 166 and 168 are varied simultaneously over the range indicated by the dashed line by selection of the peaking factor Kp which operates symmetrically. The output of multiplier 138 is supplied to an absolute value circuit 140 which results in a waveform corresponding to FIG. 10B where portion 166 is now positive. The coring factor Kc supplied from inverter 144 to summer 142 effectively removes the center portion of the waveform, such that the segments 166 and 168 are shifted vertically downward as indicated by the dashed lines. As shown in FIG. 10C, the segments 166 and 168 go to zero for a portion 170 which represents the cored section. The coring waveform applied to switch 146 is controlled by the most significant bit, i.e. the polarity of the signal. When the signal is negative the switch 146 is open and when the signal is positive switch 146 is closed. The coring waveform, as illustrated in FIG. 10C, is obtained at the output of switch 146. The representation of that waveform at the A input of multiplexer 150 is multiplexed with a multiplied version of the waveform at the B input of multiplexer 150. The multiplier 148 is controlled by the asymmetrical peaking factor Ka which may also be incremented between the limits of zero and one. The most significant bit of the original gradient controls operation of multiplexer 150 so that when the gradient is positive the B input of multiplexer 150 is selected and when it is negative the A input is selected. The output coring waveform is inverted by inverter 151 and passed to summer 154 where it is combined with the interpolated pixel (0, 0) which has been delayed by two pixels. The output is a fully processed pixel which is supplied to the D/A converter to reconvert the signal to analog form. The adaptive peaking and noise coring is applied to all displayed pixels, real and interpolated. As shown in FIG. 10D, the pixel is peaked and noise cored with independent control of the negative and positive portions of the peaking and independent control of the portions to be noise cored. This is accomplished in a relatively simple hardware circuit which constitutes another aspect of the invention.

The above described circuit is concerned specifically with the luma signal. However, similar techniques may be applied for chroma signal processing. The result of the video processing circuits of the invention is individual control of the peaking of each pixel in a video signal based upon its present value, the past value for that pixel location and the future value of that pixel location. With the inventions, crisp, noise free displays from NTSC signals may be obtained.

What is claimed is:

1. A method of operating an interlaced line scanning system comprising the steps of:
    writing successive lines of real video pixels into a memory at a 1H line frequency rate;
    reading stored video pixels from said memory at a 2H line frequency rate;
    establishing a spatial array of pixels covering two successive lines;
    developing interpolated lines of video pixels based upon gradients between selected pixels in said spatial array; and
    making both said real video pixels and said interpolated video pixels available for display at a 2H line frequency rate.

2. The method of claim 1 wherein said spatial array of pixels includes corresponding groups of pixels on said two successive lines and wherein said gradients are between diagonally opposed pairs of pixels in said array and between a vertically opposed pair of pixels in said array.

3. The method of claim 2 wherein said spatial array includes six pixels, three on each of said two successive lines and wherein said interpolated lines of video pixels are determined by the pixel values in the smallest of said gradients.

4. The method of claim 2 wherein said interpolated lines of video pixels are horizontally offset by one-half pixel duration from said real lines of video pixels.

5. The method of claim 4 wherein said spatial array includes horizontally interpolated pixels formed by averaging successive pairs of said real video pixels in said two successive lines and wherein said gradients are determined between said horizontally interpolated pixels.

6. In a progressive scan converter of the type including means for writing successive lines of real video pixels into a memory at an H rate, means for reading said real video pixels from said memory at a 2H rate and interpolation means for combining said real video pixels from said memory means to produce interpolated lines of video pixels between said real lines, the improvement comprising:
    means for establishing a spatial array of real video pixels including two successive real lines;
    means for developing gradients between selected pairs of pixels in said spatial array; and
    means for developing pixels in said interpolated lines of video pixels based upon the smallest of said gradients.

7. The converter of claim 6 wherein said gradients are taken between two diagonally opposed pairs of pixels in said array and a vertically opposed pair of pixels in said array.

8. The converter of claim 7 further comprising:
    means for developing horizontally interpolated pixels by averaging said real pixels and wherein said gradients are determined between the horizontally interpolated pixels whereby said interpolated pixels are offset by a one-half pixel duration from said real pixels.

9. In a video system:
    first demultiplexer means receiving video information in the form of a series of real video pixels occurring at a 1H line frequency rate;
    line memory means coupled to said first demultiplexer means for storing successive lines of said real video pixels;
    second multiplexer means coupled to said line memory means for reading said real video pixels therefrom at a 2H line frequency rate;
    means for averaging successive pairs of said real video pixels to develop horizontally interpolated pixels that are offset by a one-half pixel duration with respect to said real pixels;
    pixel delay means for establishing a spatial array of said horizontally interpolated pixels that includes pixels on two successive lines;
    means for establishing vertical and diagonal gradients between selected pairs of pixels in said array; and
    means for developing an interpolated pixel based upon the smallest of said gradients.

10. The system of claim 9 wherein said interpolated pixel is the average of the two pixels in said smallest gradient.

11. The system of claim 10, further including:
    means for establishing another spatial array of pixels;
    means for developing additional gradients between pixels in said another array;
    means for developing a peaking factor based upon the largest of said additional gradients; and
    means for peaking said video information as a function of said peaking factor.

12. The system of claim 11, further including means for noise coring said video information.

* * * * *